United States Patent Office 3,197,460
Patented July 27, 1965

3,197,460
ISOLATION OF CHROMAN DERIVATIVES FROM AQUEOUS SOLUTIONS
Arnulf K. Esterer, Longview, Wash., assignor to Weyerhaeuser Company, Tacoma, Wash., a corporation of Washington
No Drawing. Filed Dec. 28, 1962, Ser. No. 248,845
4 Claims. (Cl. 260—210)

This invention relates to the separation of chroman derivatives from aqueous extracts of vegetable materials and in particular relates to the separation of flavonoids from the aqueous extracts of barks of trees.

Particular reference is made to those naturally occurring products having molecular structures related to chroman and possessing a hydroxyphenyl or alkoxyphenyl group replacing one of the hydrogen atoms attached to the carbon atom in the number 2 position; by a hydroxyl group replacing one of the hydrogen atoms attached to the carbon atom in the number 3 position; and by a hydroxyl group or alkyloxy groups replacing one or more of the hydrogen atoms attached to the carbon atoms in the 5, 6, 7, and/or 8 positions.

Barks of different species of trees are one source of the above mentioned products. For example Douglas fir bark contains dihydroquercetin [3,5,7 trihydroxy, 4 oxo 2(3′,4′, dihydroxyphenyl) chroman]; while White fir bark contains quantities of 3′-methoxydihydroquercetin and stereoisomers of catechin. However, these products usually occur in small quantities in barks of trees and in the presence of many other chemical substances which make their separation and isolation extremely difficult and costly.

If whole Douglas fir bark of average chemical composition is extracted with water at a temperature of about 200° F., approximately 10% of the original dry weight of the bark becomes solubilized. This solute comprises approximately 15% ether soluble dihydroquercetin; 5% ether solubles other than dihydroquercetin; 28% of phenolics which are no soluble in ether but which are soluble in butanol; 32% of material which is insoluble in ether and butanol and which form water-insoluble lead derivatives; and 20% of carbohydrate material and other soluble residuals, including approximately 25–35% of reducing sugars.

The difficulty in separating the chroman derivative from a mixture of water solubles in an aqueous extract of bark relates to the fact that the chroman derivatives being heavily substituted with phenolic hydroxyl groups undergo many of the same chemical reactions as the acid phenolics. The difficulty of separation is further accentuated by the fact that certain of the acid phenolics effectively inhibit the crystallization of the chroman derivatives, even in relatively concentrated extract, thereby making it impossible to use the marked temperature coefficient of water solubility, which is characteristic of chroman derivatives, as a means of separation.

Previous attempts to separate flavonoids have made use of laboratory techniques using expensive and hazardous solvents. A typical method is that disclosed in U.S. Patent 2,681,907, issued June 22, 1954, to Simon H. Wender and assigned to the U.S. Atomic Energy Commission. This patent teaches the contacting of a water extract containing flavonoids and other materials with a cation-exchange resin, said resin retaining the flavonoids which are then eluted from the resin with an organic solvent.

The present invention avoids the difficulties and expense of using organic solvents and accordingly an object, therefore, is to provide an improved method for isolating chroman derivatives.

Another object is to provide an improved method for isolating chroman derivatives in good yield and purity in concentrated form from the original source material.

Still another object is to provide an improved method for isolating chroman derivatives from an aqueous extract of tree bark containing the same and other water-soluble tree bark constituents.

The present invention provides for the contacting of an aqueous extract containing chroman derivatives and other soluble materials with a cation-exchange resin at a relatively low temperature and eluting the chroman derivative retained on said resin with hot water at a temperature of from 95° to 100° C.

The sorption phase should be carried out at as low a temperature as is compatible with the solubility characteristics of the derivative being adsorbed. For aqueous extracts of barks of trees the preferred temperature is in the range of 45° to 55° C. because at lower temperatures interfering materials appear as dispersed solids. Other solutions containing chroman derivatives may use temperatures considerably lower and still selectively adsorb the chroman derivative.

Although the present invention may be utilized with substantially any mixed aqueous extract containing chroman derivatives, it is particularly advantageously utilized in isolating chroman derivatives from water extracts of the bark of trees. Suitable methods of providing such extracts are illustrated by the mehod disclosed in U.S. Patent No. 2,832,765, issued April 29, 1958, to James R. Roberts and Arthur S. Gregory.

A considerable number and variety of cation-exchange resins which may be employed in the process of the invention are known. Examples of suitable resins are sulfonated phenol-formaldehyde resins, sulfonated copolymers of monovinyl aromatic hydrocarbons and polyvinyl aromatic hydrocarbons. Cation-exchange resins which have been found particularly suitable are those having sulfonic acid functional groups of the class described in U.S. Patent No. 2,366,007. Commercial products of this class include Amberlite IR–112 and Amberlite XE–100, which are polystyrene nuclear sulfonic acids of Rohm & Haas Company manufacture. ("Amberlite" is a registered trademark of Rohm & Haas Company, Philadelphia, Pennsylvania.)

In the examples that follow, which illustrate ways in which the principle of this invention has been applied, the extracts were prepared by extracting small pieces of bark with hot water similar to the methods described in the Roberts et al. patent mentioned previously.

EXAMPLE I

A cylindrical glass column, one-inch in diameter and thirty-six inches in length was stoppered at one end, a glass wool pad inserted and the pad covered with two inches of coarse, washed sand. A cation-exchange resin, Amberlite IR–112 manufactured by Rohm and Haas Co., Philadelphia, Pennsylvania, was added to the tube to provide a column of resin twenty-four inches in length. The tube was jacketed in such a manner that its contents could be heated with steam when desired.

After thorough washing of the resin in the column with hot water, 1500 ml. of aqueous extract of whole Douglas fir bark was passed downwardly through the resin column. The temperature of the column was maintained in the range between 45° and 55° C. The rate of flow of extract through the column was maintained at an average of 30.7 ml./minute which corresponds to a rate of 0.75 gallons per cubic foot of resin-packed column volume each minute.

The aqueous bark extract had an original dissolved solids content of 1.12% by weight with 21.3% of the dissolved solids being soluble in diethyl ether. Chroman derivatives are quantitatively dissolved in diethyl ether and ether solubility is used as a convenient and simple measurement of the chroman derivative content. Experience has shown that ether solubles from aqueous extract of whole Douglas fir bark consistently comprises at least 75% dihydroquercetin, a chroman derivative.

After the 1500 ml. of extract had passed through the column and was collected for analysis for unsorbed solids, the temperature of the column was raised to 100° C. by passing steam through the surrounding jacket. Boiling water was then passed upwardly through the column at the rate of 62 ml./minute which rate corresponds to a rate of 1.5 gallons per cubic foot of resin packed column each minute. After 1500 ml. of eluting liquid had passed through the column the process was discontinued and the eluate was analyzed.

EXAMPLE II

A resin column was prepared similar to that of Example I. The temperature of the column was maintained at 45°–55° C. while 600 ml. of an aqueous extract of whole White fir bark was passed downwardly through the column. The extract contained 1.218% dissolved solids of which 16.4% was ether soluble. After the extract had passed through the column and was collected for analysis, steam was passed through the jacket surrounding the column and the temperature was raised to 100° C. Elution was effected by passing 600 ml. of hot water, maintained at a temperature in the range of 95° to 100° C., upwardly through the column and collecting for subsequent analysis.

The aqueous solutions collected in the above Examples I and II were analyzed and the data are reported in the following table.

*Table 1*

|  | Ex. I | Ex. II |
| --- | --- | --- |
| Wt. Total Solids in Extract (gms.) | 16.8 | 7.3 |
| Wt. Ether Solubles in Extract (gms.) | 3.578 | 1.2 |
| Wt. Total Solids Eluted (gms.) | 4.410 | 2.04 |
| Wt. Ether Solids Eluted (gms.) | 2.860 | 0.82 |

As a result of employing the principle of this invention, 80% of the ether solubles present in the original extract of Example I are obtained in an aqueous solution in a concentrated form. Whereas the ether solubles comprised only 21.3% of the dissolved solids in the original extract, after sorption and elution with hot water, they now comprise 65% of the dissolved solids of the eluate. As such, the eluate may be used either as is or after removal of all or part of the water. Also, it represents an efficient starting material for the isolation of pure dihydroquercetin by crystallization.

In Example II, over 68% of the ether solubles present in the original bark extract are obtained in the aqueous eluate and these solubles comprise 40% of the dissolved solids in the eluate compared to comprising only 16.4% of the dissolved solids in the original extract. Analyses made by means of the ultra-violet spectrophotometer found the ether solubles of the eluate to be of substantially the same composition as in the original bark extract comprising 52% catechin and 35% 3′ methoxydihydroquercetin.

I claim:
1. The method comprising contacting an aqueous extract of Douglas fir bark containing dihydroquercetin and other water soluble bark constituents selected from the group consisting of ether solubles other than dihydroquercetin, phenolics which are ether insoluble and butanol soluble, material which is ether and butanol insoluble and which forms water insoluble lead derivatives, and carbohydrate material, with a cation-exchange resin at a temperature in the range from 45°–55° C., separating the resulting dihydroquercetin depleted extract from the resulting dihydroquercetin retaining resin by eluating the dihydroquercetin from said resin with hot water at a temperature of 95° to 100° C.

2. The method of claim 1 wherein the cation-exchange resin contains sulfonic acid functional groups.

3. The method comprising contacting an aqueous solution containing tree bark derived flavonoids and other water soluble source material selected from the group consisting of ether solubles other than dihydroquercetin, phenolics which are ether insoluble and butanol soluble, material which is ether and butanol insoluble and which forms water insoluble lead derivatives, and carbohydrate material, with a cation-exchange resin, separating the resulting flavonoid retaining resin by eluting the flavonoid from said resin with hot water at a temperature of 95° to 100° C.

4. The method of claim 3 wherein the aqueous extract is from Douglas fir bark.

References Cited by the Examiner

UNITED STATES PATENTS 2,662,893 12/53 Kurth _____ 260—210
2,681,907 6/54 Wender _____ 260—210

LEWIS GOTTS, *Primary Examiner.*